H. HUBBELL.
REVERSE ATTACHMENT PLUG.
APPLICATION FILED FEB. 25, 1910.
994,516.
Patented June 6, 1911.
2 SHEETS—SHEET 1.
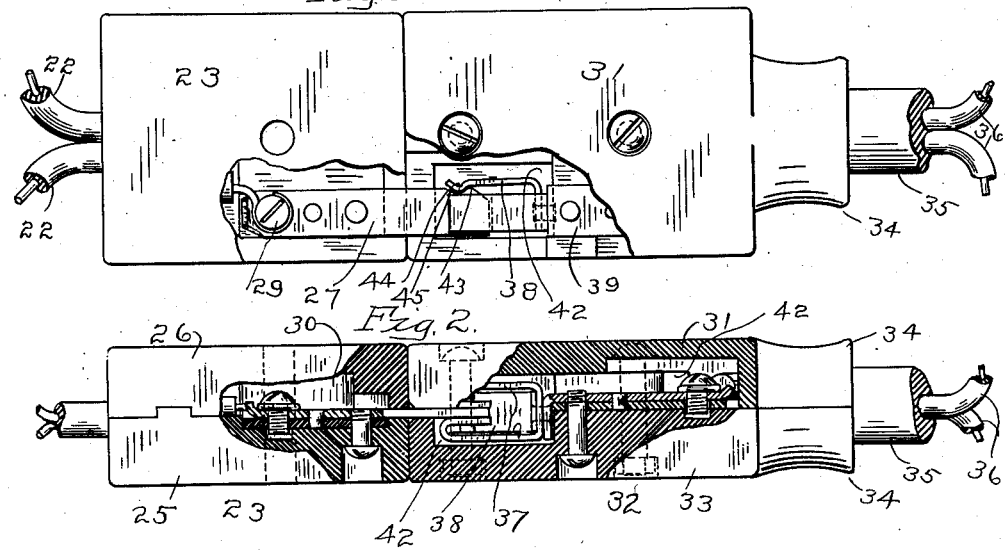
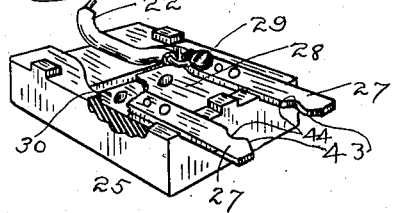
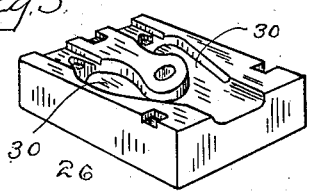
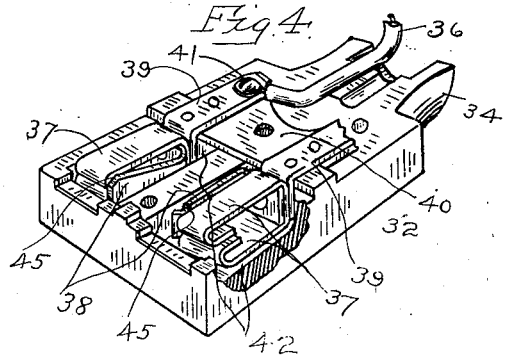
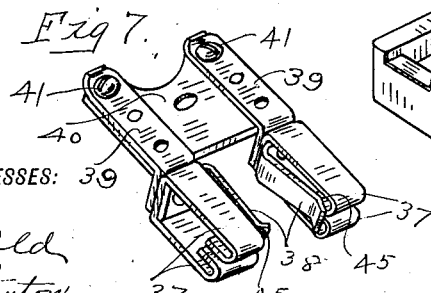
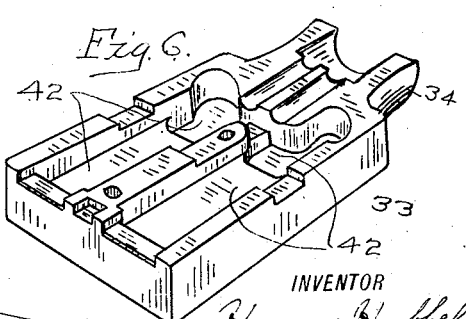
WITNESSES:
E. P. Wold
S. W. Atherton
INVENTOR
Harvey Hubbell
BY
A. M. Wooster
ATTORNEY

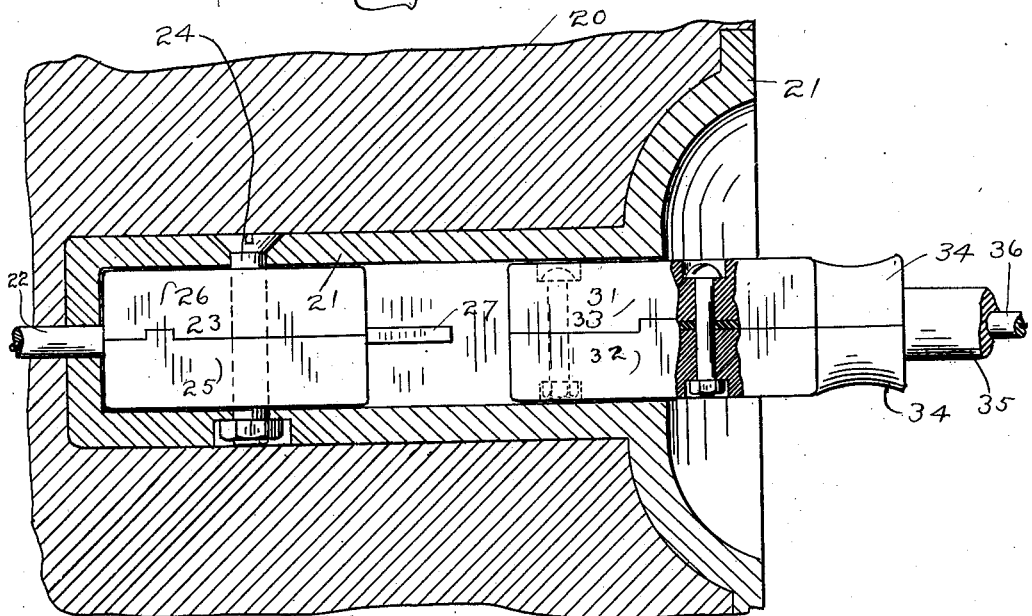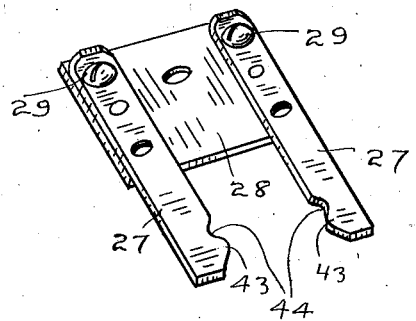

UNITED STATES PATENT OFFICE.

HARVEY HUBBELL, OF BRIDGEPORT, CONNECTICUT.

REVERSE ATTACHMENT-PLUG.

994,516.  Specification of Letters Patent.  Patented June 6, 1911.

Application filed February 25, 1910. Serial No. 545,895.

*To all whom it may concern:*

Be it known that I, HARVEY HUBBELL, a citizen of the United States, residing at Bridgeport, county of Fairfield, State of Connecticut, have invented an Improvement in Reverse Attachment-Plugs, of which the following is a specification.

This invention has for its object to provide what I term a reverse attachment plug especially adapted for various uses in which the dead member of the plug is located in a base, or other receptacle, as the base of a motor, a vacuum cleaner or a fan, and the invention has for its object to produce an attachment plug of this character in which the members of the plug which I term for convenience the live and dead members are reversed; that is to say, the projecting contacts which have heretofore been carried by the live member shall be carried by the dead member and shall be wholly covered and protected by the walls of the receiving socket in the base, the contact springs which have heretofore been placed in the dead member being in my novel reverse plug placed in the live member. The term live member will of course be understood to mean the current carrying or live member and the dead member to mean the current receiving or machine member. And the invention furthermore has for its object to provide an attachment plug of this character which shall be so constructed that the bodies of the members may be made from relatively inexpensive hard rubber composition, so called, which will not stand a high degree of heat and the contact springs and contact plates respectively shall be insulated from each other and from the body members by means of insulating plates of fiber or other suitable insulating material.

With these and other objects in view I have devised the novel reverse attachment plug of which the following description in connection with the accompanying drawings is a specification, reference characters being used to indicate the several parts.

Figure 1 is a plan view, partly broken away, showing the members of my novel attachment plug connected; Fig. 2 a corresponding elevation partly in vertical section; Figs. 3 and 4 are perspectives of the bases respectively of the dead and live members of my novel reverse attachment plug; Figs. 5 and 6 are perspectives of the caps of the said respective members; Fig. 7 a perspective of the contact springs and insulating plate of the live member detached; Fig. 8 a perspective of the contacts and insulating plate of the dead member detached; and Fig. 9 is a section of a base with the dead member in place therein in elevation and the live member in position to make a connection.

20 denotes a base which may be of any required configuration and is provided with a casing 21 to receive the members in the connected position and to cover and protect the contacts when making a connection and with a hole or holes through which electric conductors 22 pass. The dead member, which is indicated as a whole by 23, is shown as secured in the casing by means of a bolt 24 which passes through the casing and through the member. The member comprises a base 25 and a cap 26. Both base and cap may be made of any inexpensive material as ordinary hard rubber composition, so called.

27 denotes the contacts which may be of any ordinary or preferred construction and are rigidly secured to relatively thin insulating plate 28 which may be made of fiber or any suitable relatively stronger insulating material and is rigidly secured to the base.

29 denotes binding screws in the contacts to which conductors 22 are connected.

Both the base and the cap are provided with suitable recesses 30 to snugly receive the contacts, insulating plates and conductors.

31 denotes the live member as a whole which comprises a base 32 and a cap 33. I have shown the base and cap as provided with a hub 34 which receives the end of a cable 35 containing conductors indicated by 36 and is concaved to form a grip for the hand of the operator in making or breaking a connection.

37 denotes the contact springs and 38 the locking springs which are secured to plates 39 themselves secured to a relatively thin insulating plate 40 which in turn is rigidly secured to the base. Plate 40 like plate 28 is made of relatively stronger material than the base.

41 denotes binding screws in plates 39 to which conductors 36 are connected.

The base and cap are provided with recesses 42 which receive the conductors, plates 39, the insulating plate and the contact and locking springs.

It will of course be obvious that the shape or contour of the members and the special style of contacts and locking springs employed are wholly immaterial so far as the present invention is concerned. I have shown the contacts as provided with beveled ends, indicated by 43, and with locking notches 44 to receive locking projections 45 on the locking springs, and have shown the free ends of the contact springs as re-curved and extending backward parallel with each other to provide ample parallel contact surfaces with contacts 27.

The operation will be obvious from the drawing.

The dead member is permanently secured in the inner end of the casing which is made long enough to receive both members where connected, leaving the contacts inclosed and covered so that they cannot come in contact with the hand of the operator in making a connection, thus avoiding the danger of the operator receiving a shock. Contact is effected by pressing the live member into full connection with the dead member, that is until the contacts have passed between the contact springs and the locking springs have engaged the locking notches in the contacts. By providing insulating plates 28 and 40 in the members to which the contact springs and contacts are respectively attached I insure perfect insulation, avoid all danger of sparking in making and breaking the contact and enable the bases and caps of the members to be made of relatively inexpensive material as they are effectually protected by the insulating plates from the electric circuit.

Having thus described my invention, I claim:

1. In an attachment plug of the character described, a contact member comprising a base of insulating material having a recess therein, a sheet of relatively stronger insulating material fitting within said recess, means for securing said sheet to said base, spaced apart contacts rigidly secured to said sheet, and a cap constructed to cover said base.

2. In an attachment plug of the character described, a contact member comprising a base of insulating material having a recess therein, a thin sheet of relatively stronger insulating material fitting within said recess, means for securing said sheet to said base, and contact springs rigidly connected to said sheet of stronger insulating material, said recess being provided with an offset portion to receive said springs, whereby the latter are wholly inclosed within said base, a cap for said base and electrical connections for said contact springs.

3. In an attachment plug of the character described, a contact member comprising a base of low grade insulating material having a recess therein, a thin sheet of relatively stronger insulating material fitting within said recess, means for securing said sheet to said base, contact springs rigidly connected to said sheet, said recess being provided with an offset portion to receive said springs, whereby the latter are wholly inclosed within said base, a cap for said base, and electrical connections for said contact springs, said base and cap being provided with complemental curved extensions forming a concaved gripping hub.

In testimony whereof I affix my signature in presence of two witnesses.

HARVEY HUBBELL.

Witnesses:
S. W. ATHERTON,
A. M. WOOSTER.